Figure 1:
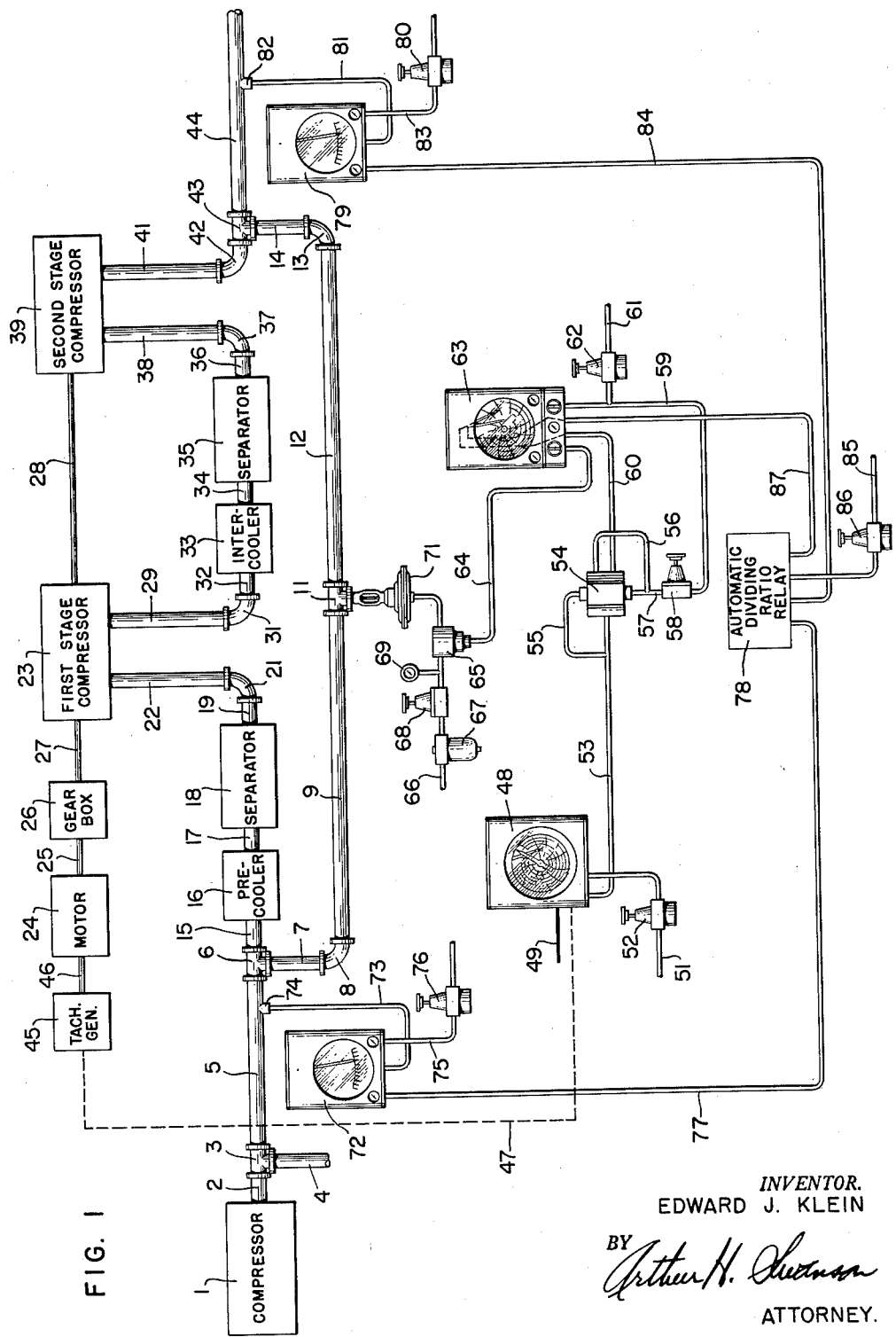

May 16, 1961 E. J. KLEIN 2,984,404
CONTROL MECHANISM
Filed March 6, 1956 2 Sheets-Sheet 1

INVENTOR.
EDWARD J. KLEIN
BY Arthur H. Swenson
ATTORNEY.

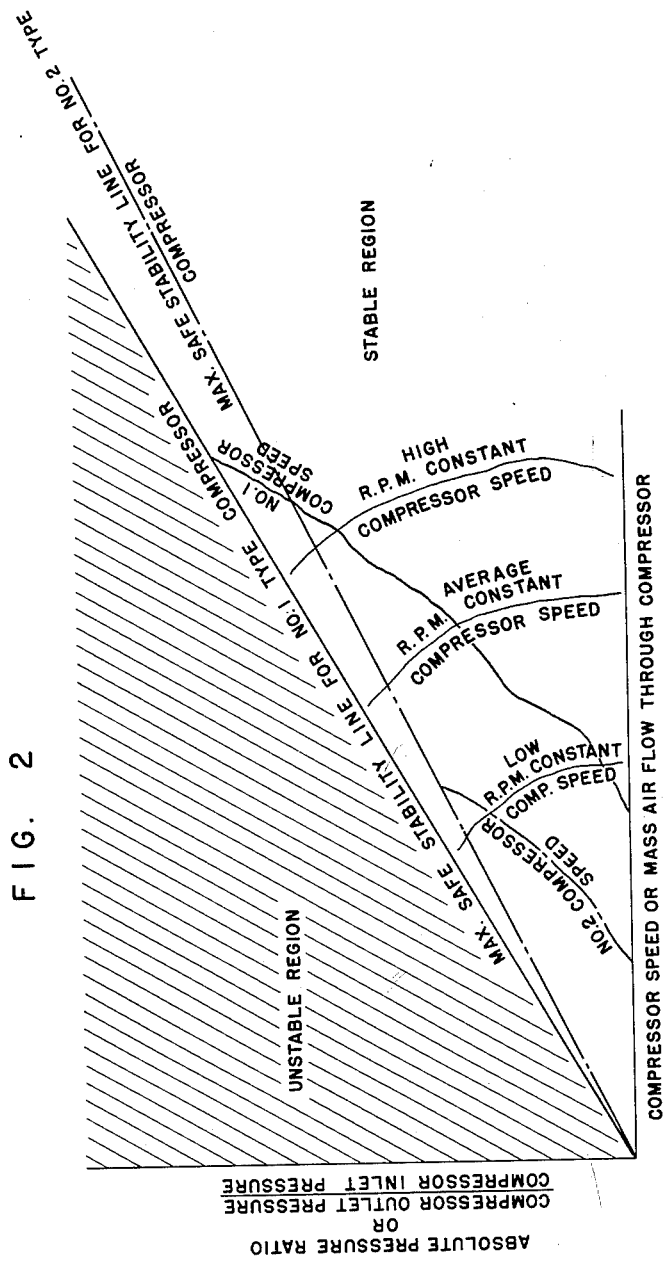

United States Patent Office 2,984,404
Patented May 16, 1961

2,984,404
CONTROL MECHANISM

Edward J. Klein, Glenside, Pa., assignor to Minneapolis-Honeywell Regulator Company, Minneapolis, Minn., a corporation of Delaware Filed Mar. 6, 1956, Ser. No. 569,733

2 Claims. (Cl. 230—4)

The object of the present invention is to provide an automatically operated control mechanism of the electro-pneumatic type which will protect compressors, such as used in gas turbine engines, and other like equipment from being operated in an unstable or stall region where the operating efficiency is low and very costly damage to such equipment can occur.

Another object of the invention is to provide instrumentation in such a control mechanism that will alter the ratio of the pressure of the fluid passing out of such equipment to the pressure of the fluid passing into such equipment in accordance with the speed at which this equipment is being operated.

More specifically, it is the object of the present invention to provide a control mechanism that will alleviate the test engineer of the worry as to whether or not a test that he is running will cause damage to a compressor or other associated equipment on which he is running a test.

Heretofore it has been necessary for an engineer during a performance test of such equipment to perform certain slide rule calculations in order to determine whether or not at any specific time during the test, he was approaching, passing into or was already operating in the aforementioned dangerous unstable region.

Still another object of the invention is to provide a control system which automatically effects a control action that will keep the ratio of the pressure of fluid passing into and out of a compressor at values which will never permit the compressor to be operated in an unstable or stall region.

A still more specific object of the invention is to provide a low pressure selecting apparatus in the aforementioned control system which alters the ratio that exists between the pressure of the fluid passing out of to the pressure of the fluid passing into a compressor in accordance with either a compressor speed measuring device or a preset supply pressure, whichever is the lowest.

A still more specific object of the present invention is to provide a control system which employs a tachometer indicating transmitter tied in with a pressure ratio controller which automatically provides a control action to prevent the value derived from dividing the magnitude of the fluid pressure flowing from a compressor by the magnitude of the fluid pressure flowing into same from passing beyond a pre-established level beyond which costly damage to the compressor would occur.

A still more specific object of the invention is to employ a control system in which the speed of a compressor is transmitted by a tachometer transmitter in the form of a fluid pressure signal to assist a pressure ratio controller in effecting a control action only so long as such a compressor speed does not exceed a predetermined maximum value.

Another object of the invention is to employ the aforementioned control action as a means of opening and closing a control valve located in a bypass line of a two stage compressor flow line so that a regulated amount of the fluid pressure flowing from the compressor unit may be re-introduced into the fluid pressure flowing into such a compressor.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

In the drawings:

Fig. 1 is a diagrammatic view showing an absolute pressure ratio control system; and Fig. 2 is a graphic representation as to how the system shown in Fig. 1 may be controlled.

By way of example I have illustrated in Fig. 1 the novel control system set forth in this application as being applied to a two stage compressor unit.

This two stage compressor unit is comprised of a compressor 1, a first portion 2 of an inlet mass air flow transmitting conduit that is connected at one end to an output pressure line of the compressor 1 and at its other end to a T 3. One output branch of this T 3 is shown connected to a conduit 4 which has its other end open to atmospheric pressure. Another output branch of this T 3 is connected to a second portion 5 of the inlet mass air flow transmitting conduit. The other end of this second conduit 5 is connected to a second T 6. The T 6 has one of its branches connected to a conduit 7 which forms one leg portion of a mass air flow bypass line 8, 9, 11, 12, 13, and 14. Another branch of the T 6 is connected to a third portion 15 of the inlet air mass flow transmitting conduit. The other end of this conduit 15 is connected to a pre-cooler 16 which in turn is connected by means of a conduit 17 to a separator 18. The separator 18 in turn is connected by way of the conduit 19, elbow 21, and conduit 22 to a first stage compressor 23.

To the left of this compressor 23 and connected therewith, there is shown a variable speed electric motor 24, a motor drive shaft 25, a speed reduction gear box 26 and a compressor drive shaft 27. To the right of the compressor 23 there is shown a first stage compressor output drive shaft 28. Connected to the output mass air flow port of the first compressor 23 there is shown a conduit 29 having an elbow 31 and a conduit 32. The other end of the conduit 32 is connected to an inter-cooler 33 and the output port of this inter-cooler in turn connected by way of the conduit 34 to a separator 35. The output port of this separator 35 is connected by way of the conduit 36, elbow 37, and conduit 38 to the input port of a second stage compressor 39. The output port of the second stage compressor is in turn connected by way of a conduit 41, elbow 42 and T 43 to an outlet mass air flow transmitting conduit 44. One of the branches of the T 43 is shown connected to the conduit 14 that forms the right end portion of a bypass connection between the outlet transmitting conduit 44 and the inlet transmitting conduits 2, 5 and 15.

While an operator is running tests on such a two stage compressor, the operator is also required to increase the speed of the motor 24 that is used to drive the first stage compressor 23. This action in turn causes the pressure of the mass air flow passing out of the final stage compressor 39 through the outlet transmitting conduit 44 to increase.

Experimentation has shown that as long as the outlet pressure of the mass flow of air passing through the conduit 44 does not exceed a predetermined maximum relationship with respect to the inlet pressure of the mass flow of air passing thorugh the conduit 5, no abnormal dangerous pressure drop will occur across the aforementioned compressors 23, 39.

It is thus, as previously stated, the prime object of the present invention to provide automatically operated instrumentation which will prevent such pressure drops from occurring and in this way keep the operation of the two stage compressor within its safe stable operating regions. By way of an example, experimentation has further shown that this instrumentation as set forth in this application can be used successfully where e.g. the input range of pressures being sensed by the inlet pressure transmitter 72 varies between zero and seventy p.s.i.a. and the input range of pressures being sensed by the outlet pressure transmitter 79 varies between zero and three hundred and sixty p.s.i.a.

This novel instrumentation comprises a tachometer generator 45 mechanically connected by means of shaft 46 to the rotating shaft 25 of motor 24. This tachometer generator is of the type described in detail in Minneapolis-Honeywell Regulator Company Specification Sheet 79a, Series 919L1. A two wire connection as indicated by the dotted line 47 connects the output of the tachometer generator 45 with the input of a tachometer indicator transmitter 48. This transmitter 48 has a current supply line 49 connected to a suitable electric power source, not shown. This transmitter 48 also has a suitable fluid pressure source, not shown, which is connected to the open end of the fluid supply line 51. A pressure regulating and air filtering device 52 may be placed in this pressure supply line between the pressure supply source and the transmitter 48. The output pressure port of this transmitter 48 is shown connected to a transmission line 53. This conduit 53 has its other end connected to the left side of a low pressure selecting relay 54. This low pressure selecting relay is of the diverting relay type manufactured under Serial No. R048B and whose construction is shown in Minneapolis-Honeywell Regulator Company Instruction Sheet Form No. 95-1323. This other end of the conduit 53 is also shown having a branch 55 connected to the central upper portion of the low pressure selecting relay 54. Connected to the right side portion of the relay 54 there is shown a regulated pressure line 56. The other end of this pressure line 56 is shown opening into a conduit 57. The conduit 57 has one open end connected to the central under side portion of the relay 54 and has another end connected to a control index positioning and pressure padding regulator 58. Connected to the input side of this regulator 58 there is shown a fluid pressure supply conduit 59 that is connected to a fluid pressure supply conduit 61. This fluid supply conduit 61 is connected to a suitable fluid pressure supply means not shown. Also shown placed in this supply line is a pressure regulating and filtering device 62. There is also shown connected to the output port of the relay 54 a low pressure transmitting conduit 60. The other end of this conduit 60 is connected to the indexer or set point adjusting mechanism of the pressure ratio controller 63. This pressure ratio controller 63 may be of the type shown in the Burdick Patent 2,548,943 issued April 17, 1951 and may include a manual control bypass panel such as is manufactured by Minneapolis-Honeywell Regulator Company under Model No. 702P6N-93P5-74 and as detailed on specification sheet 710 and Bulletin 8930. The upper end of the fluid pressure supply line 61 is also shown connected to a fluid actuated pressure ratio controller 63. This pressure ratio controller 63 is shown having an output control pressure line 64 that is connected to a booster 65 that is placed in a pressure regulated supply line 66. Also connected to this air supply line 66 there is shown a standard air filter and dripwell 67 a pressure regulator 68 and a pressure gauge 69. The left end of this fluid pressure supply line 66 is connected to a suitable fluid pressure source, not shown, and the right end of this conduit 66 is connected to the head of a diaphragm operated control valve 71. This control valve 71 in turn is operably connected to the bypass conduit 12 by means of the T 11.

The instrumentation used in the present invention also comprises an inlet pressure transmitter 72 which has an inlet port connected by means of a conduit 73 to a pressure tap 74 in the inlet conduit portion 5 of the two stage compressor system. The inlet pressure transmitter 72 also has a fluid pressure supply line 75 connected to a suitable fluid pressure source, not shown, by way of the pressure regulator 76. The outlet pressure port of this inlet pressure transmitter 72 is connected by way of the transmitting conduit 77 to an automatic dividing ratio relay 78. This dividing relay may be of the type shown, for example, in the Sorteberg Patent 2,643,055, filed August 26, 1952, and issued June 23, 1953.

An output pressure transmitter 79 is connected by means of a conduit 81 to a pressure tap 82 in the outlet pressure line 44 of the two stage compressor. A fluid pressure supply is transmitted from a fluid pressure source, not shown, through the supply line 83 by way of the regulator 80 to the transmitter 79. The output pressure port of this outlet pressure transmitter 79 is connected by means of the fluid pressure transmitting conduit 84 to a second input port of the automatic dividing ratio relay 78. A fluid pressure supply is transmitted from a fluid pressure source, not shown, through the supply conduit 85 by way of the regulator 86 to the automatic dividing ratio relay 78. Also, an output fluid pressure signal transmitting conduit 87 is shown connected at one of its ends to an output fluid pressure port of the dividing relay 78 and at its other end to the pressure ratio controller 63.

When starting up a system as that shown in Fig. 1, it is necessary for the operator to use a speed regulating apparatus, not shown, to gradually increase the speed of his compressor drive motor 24 from an initially very slow to a very fast but safe compressor speed. In order to accomplish this operation safely the present invention employs a control system in which a tachometer generator 45 is employed to send, initially, an electrical signal of small magnitude to a tachometer indicator transmitter 48. This transmitter 48 in turn converts this initially small electrical signal into a pneumatic signal which is also initially of a proportionately small magnitude. This pneumatic signal is transmitted to the low pressure selecting relay 54 by way of the conduit 53. This relay 54 determines whether a variable adjustable fluid supply pressure flowing to this relay through the conduits 61, 59, 57 and regulators 62, 58 is greater or less than the signal that is being transmitted to it from the tachometer indicator 48 and then permits the lower of these two pressures to be transmitted to a pressure ratio controller 63 to automatically adjust its control point setting. The selected magnitude of the fluid supply pressure being fed into the low pressure selecting relay 54 by way of the conduit 57 is initially higher than the low level fluid pressure signal that the tachometer indicator 48 initially transmits to this relay through the conduit 53. This low pressure signal being transmitted by the tachometer indicator 48 will thus be the one that is transmitted by the relay 54 to the ratio controller 63 to automatically adjust its control point setting.

It can thus be seen that during the initial stages of compressor speed up any alteration of the automatically adjusting control point settings of the pressure ratio controller 63 will be a function of the speed at which the compressor is being operated.

As the compressor speed is increased by the operator the magnitude of the electrical signal being transmitted to the aforementioned tachometer indicator transmitter 48 by the tachometer generator 45 will also be gradually increased. This action in turn will cause the fluid pressure signal being transmitted to the low pressure selecting relay 54 by the transmitter 48 to likewise increase. As the magnitude of this latter pneumatic signal acting on the low pressure relay 54 is built up to the level of the magnitude of the regulated supply pressure of the fluid flowing through the conduits 61, 59 and 57, the relay will permit this increasingly greater pressure signal to be transmitted to the pressure ratio controller 63. This latter mentioned increasing fluid pressure signal that is transmitted through conduit 60 will thus continuously act to automatically adjust the control point setting of the pressure ratio controller 63 in accordance with the speed at which the compressor is being operated. Such a control point adjustment of the pressure ratio controller 63 by the fluid pressure signal sent through the relay 54 will continue until this pressure signal exceeds the pressure of the regulated supply fluid that is flowing through the conduit 61, regulator 62, conduit 59, regulator 58, and the conduit 57 to the relay 54. When this happens the relay 54 will automatically effect a control action which will cut out the signal being transmitted to it from the tachometer 48 as the controlling fluid that it is transmitting through conduit 60 to the pressure ratio controller 63 and also act to cut in instead the padding or biasing pressure flowing through to the conduit 57 with the pressure ratio controller 63. When this latter action occurs there will be a steady flow of fluid at a predetermined constant pressure passing from conduits 59, 57 through relay 54 and through conduit 60 to retain the control point adjustment at the position it is in at the time the shift from tachometer transmitter control to the aforementioned padding pressure control occurred. If it is desired to adjust the control point to a different position when in this padding pressure control condition the operator need only adjust the position of the knob on top of the padding pressure regulator 58.

Furthermore, should the speed of the motor 24 then be reduced to such a level as to cause the level of the pressure of the fluid flowing through the conduit 53 from the tachometer transmitter 48 to the relay 54 to drop below the level of the pressure of the padding fluid flowing through the conduit 57 the relay 54 will then shift the control point setting control of the index of the controller 63 back to the fluid pressure that is being transmitted through 53 by the tachometer indicator transmitter 48.

From the above description of the instrumentation used to alter the control point settings of the fluid actuated pressure ratio controller 63, it can be seen that as long as the level of the transmitted fluid pressure signal in conduit 53 is kept lower than that of the level of the padding pressure, which level is determined by the knob portion of the regulator 58, changes in the level of this fluid in conduit 53 will alter the control point setting of the controller 63. It should also be readily understandable from the above description that the portion of the knob of regulator 58 is preset to a safe absolute pressure ratio level at which this padding pressure rather than the fluid pressure from the tachometer transmitter 48 will take over control of the index and in this way prevent the control point of the controller to be automatically raised beyond this regulated preset safe absolute pressure ratio level.

While this set point regulating control action is taking place the magnitude of the pressure of the mass flow of air passing through the conduit 5 into the inlet side of the compressor is sensed by a suitable pressure tap means 73, 74. This pressure sensing tap means 73, 74 permits any change that occurs in the magnitude of the pressure of the inlet mass flowing air passing through the conduit 5 to be transmitted to the inlet pressure transmitter 72. This transmitter 72 in turn transmits a fluid pressure signal, which is proportional to the magnitude of the pressure of the inlet mass of air flowing through the conduit 5, by way of the conduit 77 to a first input part of the automatic dividing ratio relay 78.

In a similar manner the magnitude of the pressure of the mass flow of air passing through the outlet conduit 44 of the compressor is sensed by a suitable pressure tap means 81, 82. This pressure sensing tap means 81, 82 permits any change that occurs in the magnitude of the pressure of the outlet mass flow of air passing through conduit 44 to be transmitted to the outlet pressure transmitter 79. This transmitter 79 in turn transmits a fluid pressure signal, which is proportional to the magnitude of the pressure of the outlet mass of air flowing through the conduit 44, by way of conduit 84 to a second inlet port of the automatic dividing ratio relay 78.

A fluid pressure supply is transmitted from a fluid pressure source, not shown, through the conduit 85 by way of the pressure regulator 86 to the automatic dividing ratio relay 78. This ratio relay 78 may be of the type disclosed in the Sorteberg Patent 2,643,055, previously referred to. The function of this automatic ratio relay 78 is to transmit an output control pressure through the conduit 87 to the pen actuating and controlling pressure chambers of the pressure ratio controller 63 that is proportional to the quotient of the output pressure signal in conduit 84 representing the magnitude of the pressure in the three stage compressor output conduit 44 divided by the input pressure signal in the conduit 77 representing the magnitude of the pressure in the compressor input conduit 5. Although not shown in the drawing, this ratio relay 78 is provided with a means for adjusting the constants of proportionality to a desired predetermined value. Should the ratio of the output signal pressure to the input signal pressure, or in other terms, the pressure drop across the two stage compressor reach an abnormally high level the fluid pressure signal being transmitted to the pressure ratio controller through conduit 87 will cause the controller 63 to transmit a corrective output pressure through conduit 64 to the booster 65, that will in turn permit the control valve 71 to be immediately opened. The opening of this valve will in turn permit a portion of the high pressure fluid in the outlet conduit 44 to flow through the bypass line 14, 13, 12, 11, 9, 8, 7 into the low pressure inlet conduit 5 to the two stage compressor. This control action thus reduces the previously mentioned abnormally high pressure drop that was present across the two stage compressor.

Fig. 2 shows graphically how the control system disclosed under the aforementioned description of Fig. 1 permits the magnitude of mass flow of air or a gas passing through a two stage compressor automatically effects a control action that will prevent the quotient signal derived from dividing the pressure of the fluid passing out of by the pressure of the fluid passing into a compressor from exceeding a pre-established relationship.

While under test conditions the speed of a number one type of two stage compressor indicated in Fig. 2 is as characterized by the contour of the line referred to in Fig. 2 as number one compressor speed. Heretofore, when an operator changes the speed of his compressor in this fashion it was difficult for him to ascertain at any one instant whether the point on this line at which he was operating his compressor was below, at, on, or above the place where the speed line intersects the maximum safe stability line for this number one compressor. If the instant speed at which he is operating his compressor causes the point on this speed line to be located at a position which is above the aforementioned stability line he will be operating his compressor in the dangerous unstable region noted in Fig. 2.

Similarly, when the aforementioned compressor is being operated so that it is following either a slow, average, or fast constant speed line pattern as shown in Fig. 2 and the demand for the mass flow of air flowing out of the compressor is such that the absolute pressure quotient becomes greater than the maximum safe value as indicated by the stability line the control system will then function to throttle the control valve 71. This control valve throttling action thus prevents the absolute pressure quotient from becoming greater than the aforementioned maximum safe value above which value serious, costly damage to the compressor blading could occur.

The control instrumentation set forth in this application is thus useful in automatically preventing any speed change in the compressor or in other words change in mass flow of air, from causing this compressor speed line from being extended beyond the maximum stability line shown in Fig. 2.

Fig. 2 also shows in a dot and dash line fashion another maximum safe stability line and a speed line for any other multi stage compressor which may be similar to but have a different capacity to that of the number one compressor described supra. It will be noted that the safe stability line for this multi stage compressor, referred to in Fig. 2 as number two compressor, is at a lower angle with respect to the abcissa than is the safe stability line of compressor number one.

The instrumentation as set forth in this application is versatile in that the setting of the pressure padding or biasing regulator 58 of the low pressure relay 54 can readily be changed so as to prevent the operator from allowing any point on the speed test line for compressor two from going beyond its pre-established maximum safe stability line.

It can thus be seen from the aforementioned description of the operation of this control mechanism that it provides an operator that is running a test, e.g. on test equipment connected to the output pressure line 44 of such multi stage compressors or like equipment, with the assurance that regardless of what changes in speed he desires to make to this equipment, or no matter in what manner the mass air or gas flow to such test equipment occurs, he will always be operating in the stable region as shown in Fig. 2 of the drawings.

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. A fluid conveying system for use with a motor driven variable speed regulated compressor having a suction input conduit and a pressure discharge conduit to accommodate the safe flow of a fluid under pressure into and out of said compressor, said conveying system comprising a first fluid pressure transmitter having an outlet conduit connected thereto, a first passageway connecting a portion of the flow of fluid passing through the suction input conduit with said transmitter, said transmitter being responsive to changes occurring in the absolute pressure of said last mentioned fluid to transmit a first fluid pressure signal through the outlet conduit the pressure level of which is changed in accordance with changes which occur in the pressure level of the fluid in said suction input conduit, a second fluid pressure transmitter having an outlet conduit connected thereto, a second passageway connecting the flow of fluid passing through the pressure discharge conduit with said second transmitter, said second transmitter being operably responsive to changes occurring in the absolute pressure of the fluid flowing through said discharge conduit to transmit a second fluid pressure signal through its outlet conduit the pressure level of which is changed in accordance with changes which occur in the pressure level of the fluid in said discharge conduit, a fluid pressure operated quotient extraction means having a third outlet conduit, said quotient extracting means further having a first inlet fluid pressure port connected to the outlet conduit of said first transmitter and having a second inlet fluid pressure port connected to the outlet conduit of said second transmitter, said quotient extracting means being operably responsive to changes occurring in the pressure level of said fluids in said outlet conduit to convert the pressure levels of said last mentioned fluids into a third fluid pressure signal, the pressure level of said third signal being directly proportional to the mathematical value resuling from the division of the pressure level of the second fluid pressure signal by the pressure level of said first fluid pressure signal, a ratio controller, said third outlet conduit being connected at one end to an outlet port of said quotient extracting means and at its opposite end to a first inlet port of said ratio controller to accommodate the passage of said third fluid pressure signal therethrough, said conveying system further being provided with a means to sense the speeds over which said motor drives said compressor, a compressor speed indicating transmitter connected to said sensing means and having a fourth outlet conduit connected thereto, said speed indicating transmitter being responsive to changes in the speed sensed by said speed sensing means to transmit by way of said fourth outlet conduit a fluid pressure control point signal that is proportional to the speed of said compressor to a second inlet port of said ratio controller, a fluid actuated control valve, said control valve being positioned in a by-pass conduit extending externally across said compressor between said suction input conduit and said pressure discharge conduit and wherein said fluid actuated control valve forms a variable adjusted restriction therein, a fluid pressure supply conduit connected to a fluid pressure air supply at one end and to a head portion of said control valve at its other end, a fluid pressure regulator positioned in said last mentioned conduit to regulate the level of the fluid pressure passing therethrough to a substantially constant value, a booster positioned in said supply conduit between said regulator and said control valve to provide a large regulated volume flow of said fluid in said supply conduit between said booster and the head portion of said control valve, a passageway between an outlet port of said ratio controller and said booster, said ratio controller being responsive to changes in the magnitude of said third output fluid pressure signal and the magnitude of said fluid pressure control point signal to transmit a fifth fluid pressure signal through said last mentioned passageway to control the pressure level of said fluid in said supply conduit which said booster applies to the head of the control valve, and wherein changes occurring in the pressure level of said fifth signal will cause the rate of flow of fluid passing through said bypass conduit positioned between said suction input conduit and pressure discharge conduit to be altered and the magnitude of said third output fluid pressure signal to be made substantially equal to that of said fluid pressure control point signal.

2. A fluid conveying system as defined in claim 1 wherein a low pressure selecting relay is associated with said fourth conduit which extends between said speed indicating transmitter and said ratio controller, a conduit connecting said selecting relay to a fluid supply pressure, a regulator positioned in said last mentioned conduit to maintain the pressure level of said last mentioned supply fluid being applied to said low pressure selecting relay at a pre-selected value, said selecting relay being responsive to changes in the magnitude of the pressure of the fluid being transmitted by said speed indicating transmitter through said fourth outlet conduit and which is operative when said fluid pressure exceeds said pre-selected pressure level of said supply fluid pressure, to prevent said fluid pressure from said speed indicating transmitter from being transmitted to said ratio controller, and to apply said supply fluid pressure to said ratio controller, said selecting relay being further responsive when said fluid in said fourth conduit drops below said pre-selected pressure level, to apply said fluid pressure from said speed indicating transmitter to said ratio controller and to prevent said supply fluid pressure from being applied to said ratio controller.

References Cited in the file of this patent
UNITED STATES PATENTS

| | | |
|---|---|---|
| 2,000,721 | Standerwick | May 7, 1935 |
| 2,548,943 | Burdick | Apr. 17, 1951 |
| 2,643,055 | Sorterberg | June 23, 1953 |
| 2,661,145 | Heineman | Dec. 1, 1953 |
| 2,672,726 | Wolfe et al. | Mar. 23, 1954 |
| 2,762,559 | Faught | Sept. 11, 1956 |